US006808669B2

(12) United States Patent
Kim

(10) Patent No.: US 6,808,669 B2
(45) Date of Patent: Oct. 26, 2004

(54) METHOD OF MANUFACTURING A HIGH VOLTAGE TRANSFORMER FOR MICROWAVE OVEN

(75) Inventor: Cheol-jin Kim, Suwon (KR)

(73) Assignee: Samsung Electronics Co. Ltd., Suwon (KR)

( * ) Notice: Subject to any disclaimer, the term of this patent is extended or adjusted under 35 U.S.C. 154(b) by 153 days.

(21) Appl. No.: 10/093,711

(22) Filed: Mar. 11, 2002

(65) Prior Publication Data

US 2002/0089085 A1 Jul. 11, 2002

Related U.S. Application Data

(62) Division of application No. 09/543,865, filed on Apr. 5, 2000.

(30) Foreign Application Priority Data

Jul. 28, 1999 (KR) ........................................... 99-30786

(51) Int. Cl.[7] .......................... B29C 45/14; B29C 70/70
(52) U.S. Cl. ................................ 264/272.19; 264/272.2
(58) Field of Search ............................. 264/263, 271.1, 264/272.11, 272.15, 272.16, 272.19, 272.2; 29/602.1, 605, 606

(56) References Cited

U.S. PATENT DOCUMENTS

| | | | | |
|---|---|---|---|---|
| 4,221,949 A | | 9/1980 | Minakawa | |
| 4,763,095 A | * | 8/1988 | Bradt | 336/96 |
| 4,982,498 A | * | 1/1991 | Umezaki | 29/602.1 |
| 5,317,300 A | * | 5/1994 | Boesel | 336/96 |
| 5,524,334 A | * | 6/1996 | Boesel | 29/605 |
| 5,577,316 A | * | 11/1996 | Kaelin | 29/606 |
| 5,886,327 A | | 3/1999 | Lee | |
| 6,103,157 A | * | 8/2000 | Behm et al. | 264/102 |
| 6,334,972 B1 | * | 1/2002 | Kim | 264/263 |

* cited by examiner

*Primary Examiner*—Angela Ortiz
(74) *Attorney, Agent, or Firm*—Stites & Harbison, PLLC; Ross F. Hunt, Jr.

(57) ABSTRACT

A high voltage transformer for a microwave oven includes a core, and primary and secondary coils. An insulation molding part encloses at least a part of the secondary coil and has a sensor accommodation portion formed therein. A temperature sensor is accommodated in the sensor accommodating portion for detecting temperature of the secondary coil. The sensor accommodating portion can be formed inside of the insulation molding part together with the temperature sensor, or formed outside of the insulation molding part in a pocket shape. With either configuration, the temperature sensor can be positioned at the correct sensor position, thereby improving the detecting accuracy of the temperature sensor. In addition, it is easy to repair and/or replace the temperature sensor.

8 Claims, 9 Drawing Sheets

METHOD OF MANUFACTURING A HIGH VOLTAGE TRANSFORMER FOR MICROWAVE OVEN

CROSS REFERENCE TO RELATED APPLICATION

The present application is a divisional of application Ser. No. 09/543,865 filed on Apr. 5, 2000.

BACKGROUND OF THE INVENTION

1. Field of the Invention

The present invention relates to high voltage transformers for microwave ovens and manufacturing methods therefor, and more particularly, to an improved high voltage transformer for a microwave oven including a core, and primary and secondary coils, and an improved manufacturing method therefor.

2. Description of the Related Art

A typical microwave oven comprises a casing or housing having a cooking chamber and an electronic component compartment, a door for the cooking chamber, and a control panel installed in front of the electronic component compartment. A plurality of electronic components are housed in the electronic component compartment. These electronic components include a high voltage transformer for generating high voltage when the microwave oven is supplied with power from a power supply, a high voltage capacitor which is charged to a high voltage by the high voltage transformer, and a magnetron for generating microwaves and radiating the microwaves into the cooking chamber when discharge of the high voltage capacitor supplies the magnetron with high voltage.

FIG. 8 is an exploded perspective view of a conventional high voltage transformer, while FIG. 9 is an enlarged cross sectional view taken generally along line IX—IX of FIG. 8, showing a part of a secondary coil. As shown in FIG. 8, the conventional high voltage transformer, which is denoted 120, has an I-shaped core 121, and an E-shaped core 123, both of which are made of silicon steel. A primary coil 125 is connected to an external power supply, (not shown) and a secondary coil 129 is connected to a magnetron (not shown). An insulating member or micasheet 127 made of a suitable insulating material is positioned between the primary and secondary coils 125 and 129, and a heater coil 131 is positioned between the insulating member 127 and the secondary coil 129. As illustrated, insulating member 127 may be formed as two separate parts.

Each of the primary and secondary coils 125 and 129 is covered with a respective insulating sheet or covering 133 for insulating the coils 125 and 129 from other components. As illustrated, the respective insulating sheets 133 can be formed of multiple parts. Beside the secondary coil 129 is installed a temperature sensor 135 for detecting temperature of the secondary coil 129 so as to protect the secondary circuit for the secondary coil 129. The temperature sensor 135 is positioned inside the insulating sheet 133 enclosing the secondary coil 129 as shown in FIG. 9. Alternately, sensor 135 can be fixed between the secondary coil 129 and the core 121 by a tape (not shown). Another insulating sheet 137 is positioned between the temperature sensor 135 and the secondary coil 129 so as to prevent the temperature sensor 135 from contacting the secondary coil 129.

In the above-described conventional high voltage transformer for a microwave oven, because the temperature sensor 135 is fixed in position by the insulating sheet 133 enclosing the secondary coil 129, the insulating sheet 133 can detach from the secondary coil 129 when the high voltage transformer 120 is in operation and the temperature of the high voltage transformer 120 can increase beyond a predetermined value. As a consequence, the temperature sensor 135 cannot be securely disposed at its optimum or desired position with respect to the secondary coil, and under conditions such as those outlined above, the temperature sensor 135 cannot precisely detect the temperature of the secondary coil. In addition, with this conventional configuration, the efficiency of insulation is not optimal. Further, because the temperature sensor 135 is fixed to the secondary coil 129 with the insulating sheet, or in the non-illustrated embodiment, to the fixing tape, the insulating sheet or the fixing tape must be removed by hand for inspecting, repairing or replacing the sensor, thereby decreasing the efficiency of any such inspection, repair or replacement.

SUMMARY OF THE INVENTION

To solve the above discussed problems, it is an object of the present invention to provide a high voltage transformer for a microwave oven in which a temperature sensor is securely positioned at its desired position relative to a secondary coil, thereby improving the detecting accuracy of the temperature sensor, and to provide a method of manufacturing such a transformer.

It is another object of the present invention to provide a high voltage transformer, and a manufacturing method therefor, wherein the associated temperature sensor can be installed and removed in a simple manner so as to permit the sensor to be easily repaired or replaced.

To accomplish these and other objects of the present invention, there is provided a high voltage transformer for a microwave oven including a core, and primary and secondary coils, wherein the high voltage transformer further comprises an insulation molding part which encloses at least a part of said secondary coil and which includes a sensor accommodating portion, and a temperature sensor disposed or accommodated in said sensor accommodating portion for detecting temperature of the secondary coil.

Preferably, the sensor accommodating portion is formed inside of the insulation molding part, and the temperature sensor is one of a thermostat and a thermistor. Advantageously, when a thermistor is used, a safety device such as a fuse is also employed.

In an alternative preferred embodiment, the sensor accommodating portion has the shape of a pocket, or is otherwise shaped, so that the temperature sensor can be easily put into, and taken out of, the sensor accommodating portion, and the temperature sensor comprises one of a thermostat, a thermistor and a fuse.

According to a further aspect of the present invention, there is provided a method for manufacturing a high voltage transformer for a microwave oven, the transformer including a core, primary and secondary coils, and a temperature sensor for detecting temperature of the secondary coil and the method including the steps of: accommodating the secondary coil and the temperature sensor in a molder member; molding the secondary coil and the temperature sensor accommodated in the molder member into an insulating molding part accommodating the temperature sensor, and enclosing at least part of the secondary coil such that the temperature sensor is fixed in position relative to the secondary coil.

Advantageously, the molding step comprises molding a temperature sensor accommodating portion into the molding part in which the temperature sensor is accommodated. In a beneficial implementation, the sensor and the secondary coil are molded together such that the sensor is disposed directly adjacent to the secondary coil. Advantageously, the external sensor accommodating portion is formed as a pocket defining member on an outside surface of the insulating molding part. Preferably, the temperature sensor is one of a thermostat and a thermistor.

According to another aspect of the present invention, there is provided a manufacturing method of a high voltage transformer for a microwave oven, the transformer including a core, primary and secondary coils, and a temperature sensor for detecting temperature of the secondary coil, and the method comprising the steps of: providing a molder member for forming an insulating molding part including an external sensor accommodating portion; disposing the secondary coil in the molder member; and molding the secondary coil in the molder member to form the insulating molding part with at least a part of the secondary coil molded therein and to form the external sensor accommodating portion in spaced relation to the secondary coil so as to permit placement of the temperature sensor into, and removal of the sensor from, the sensor accommodating portion. Preferably, the temperature sensor is one of a thermostat, a thermistor and a fuse.

BRIEF DESCRIPTION OF THE DRAWINGS

The present invention will be better understood, and the various objects and advantages thereof will be more fully appreciated, from the following description of the invention, taken in conjunction with the accompanying drawings, in which.

DETAILED DESCRIPTION OF THE INVENTION

Preferred embodiments of the present invention will now be described with reference to the accompanying drawings.

Figure 1:
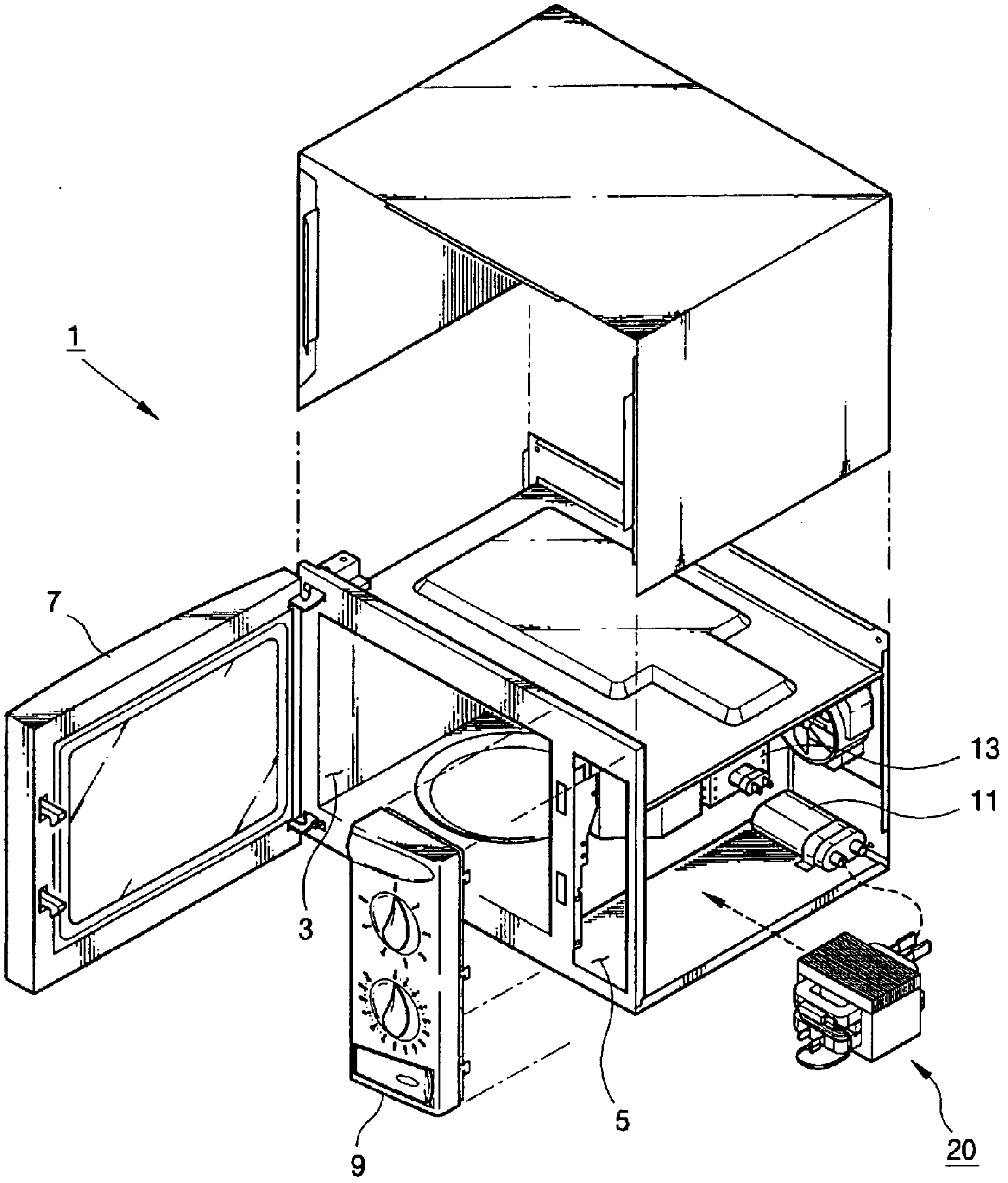
FIG. 1 is an exploded perspective view of a microwave oven including a high voltage transformer according to the present invention.

Referring to FIG. 1 which is, as noted above, an exploded perspective view of a microwave oven including a high voltage transformer according to a first embodiment of the present invention, the microwave oven comprises a casing or housing 1 which includes a cooking chamber 3 and an electronic component compartment 5. A door 7 provides access to the cooking chamber 3, and a control panel 9 is installed in front of the electronic component compartment 5. A plurality of electronic components are housed in the electronic component compartment 5. These include a high voltage transformer 20 for generating high voltage when the microwave oven is supplied with power from a power supply (not shown), a high voltage capacitor 11 which is charged to a high voltage by the high voltage transformer 20, and a magnetron 13 for generating microwaves and radiating the microwaves into the cooking chamber 3 when discharge of the high voltage capacitor 11 supplies the magnetron 13 with high voltage.

Figure 2:
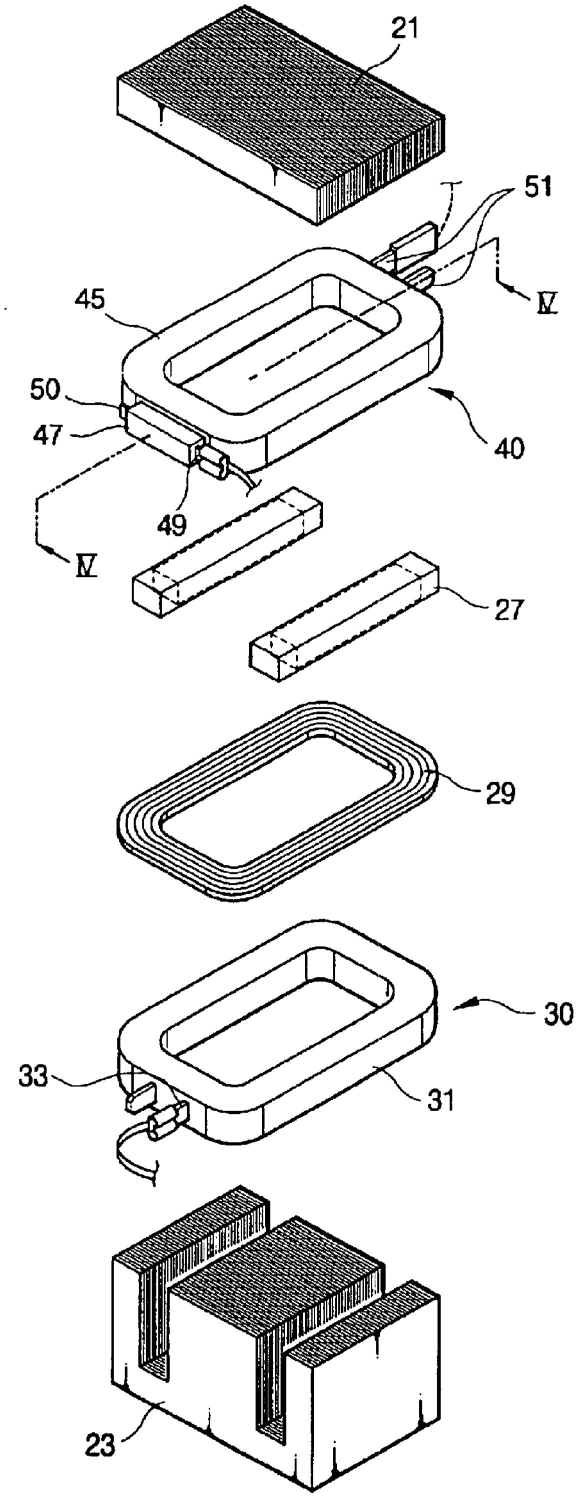
FIG. 2 is an exploded perspective view, drawn to an enlarged scale, of the high voltage transformer of FIG. 1.
Figure 3:
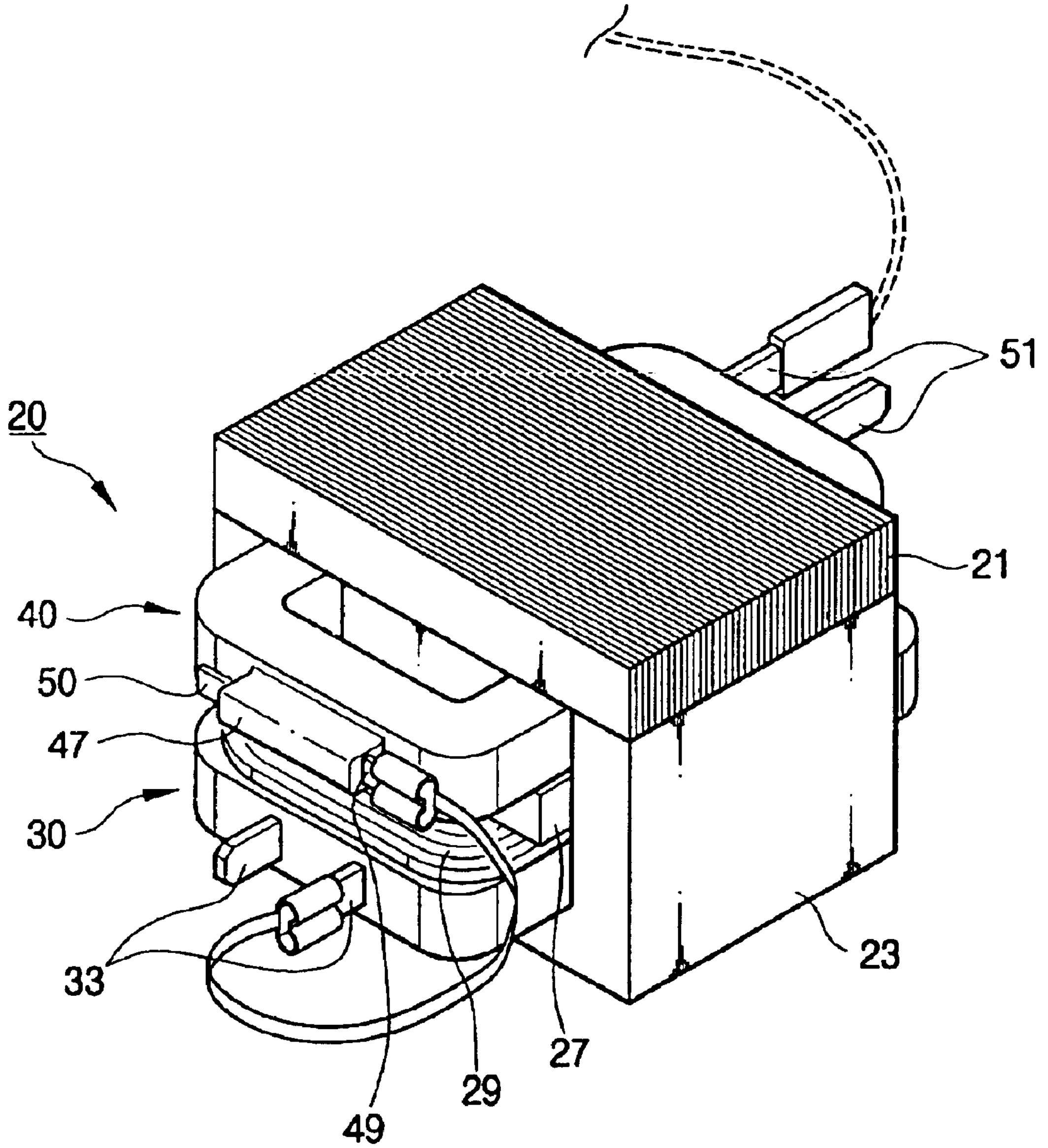
FIG. 3 is an assembled perspective view of the high voltage transformer of FIG. 2.
Figure 4:
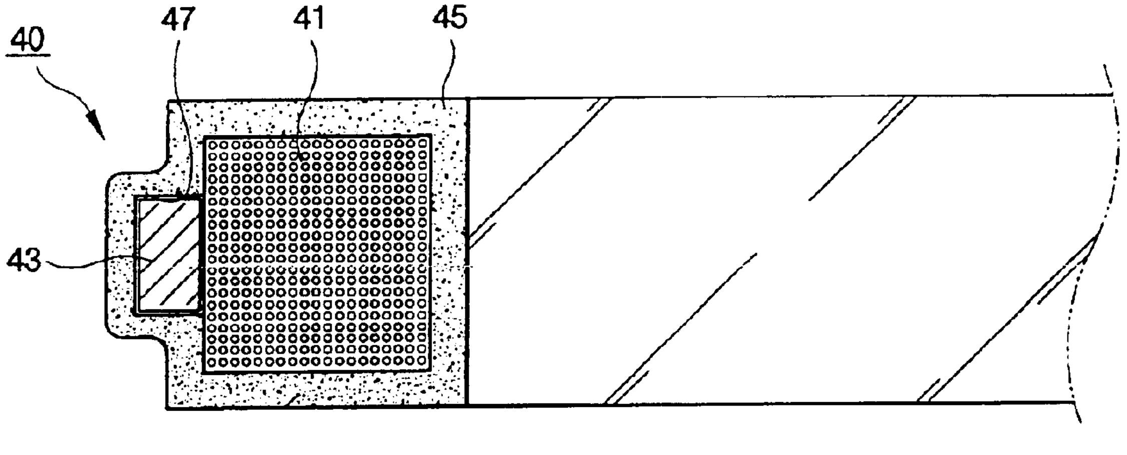
FIG. 4 is an enlarged cross sectional view taken generally along line IV—IV of FIG. 3, showing a portion of the secondary coil part.

The transformer 20 is shown in more detail in FIGS. 2, 3 and 4, wherein, as noted above, FIG. 2 is an exploded perspective view of the high voltage transformer 20 of FIG. 1, FIG. 3 is an assembled perspective view of the high voltage transformer of FIG. 2 and FIG. 4 is an enlarged cross sectional view taken generally along line IV—IV of FIG. 3. As shown in various of these figures, the high voltage transformer 20 includes an I-shaped core 21, and an E-shaped core 23, (both of which are preferably made of silicon steel), a primary coil part 30 which is connected to the external power supply (not shown), and a secondary coil part 40 which is connected to the magnetron 13. An insulator or micasheet 27, made of a suitable insulating material, is positioned between the primary and secondary coil parts 30 and 40, and a heater coil 29 is positioned between the insulator 27 and the secondary coil part 40.

The primary coil part 30 includes an insulation molding part or molded insulation part 31, and a primary coil (not shown) enclosed by the insulation part 31. On the outer surface of the insulation molding part 31 is installed a pair of input terminals 33 for receiving power from the external power supply (not shown).

The secondary coil part 40 has a secondary coil 41 (see FIG. 4) wound in the form of an annulus or ring, and a temperature sensor 43 (FIG. 4) for detecting temperature of the secondary coil 41 to protect the secondary circuit including secondary coil 41. A variety of types of sensors can be used as the temperature sensor 43 as described below. The secondary coil part 40 also includes an insulation molding part 45 for insulating the secondary coil 41 from other components such as the temperature sensor 43, the I-shaped core 21, and the E-shaped core 23. The insulation molding part 45 includes a sensor accommodating portion 47 in which the temperature sensor 43 is accommodated. As shown in FIG. 4, the temperature sensor 43 is placed in the sensor accommodating portion 47 adjacent to the secondary coil 41 and is molded together with the secondary coil 41 into an integral unit.

A thermostat is preferably used as the temperature sensor 43 which is molded together with the secondary coil 41. The thermostat detects temperature of the secondary coil 41 and corresponding temperature values are received by a controller (not shown). The thermostat is automatically turned off when the detected temperature is above a predetermined value. Where the thermostat is used as the sensor 43, one terminal 49 (FIGS. 2 and 3) of the thermostat is connected to one of the input terminals 33 installed in the primary coil part 30 and the other terminal 50 thereof (FIGS. 2 and 3) is connected to the external power supply (not shown). The secondary coil part 40 includes a pair of connection terminals 51 which are spaced from, and preferably disposed in opposition to, the temperature sensor 43, and which are connected to other components in the electronic component compartment 5.

In an alternative embodiment, a thermistor is used as a temperature sensor 43. In this embodiment, the thermistor detects temperature of the secondary coil 41 and the corresponding detected temperature values are received by the controller (not shown). However, since the thermistor is not turned off even though the detected temperature is above a predetermined value, it is preferable to use the thermistor along with one or more other components which function as a temperature responsive safety device (e.g., a fuse).

Figure 5:
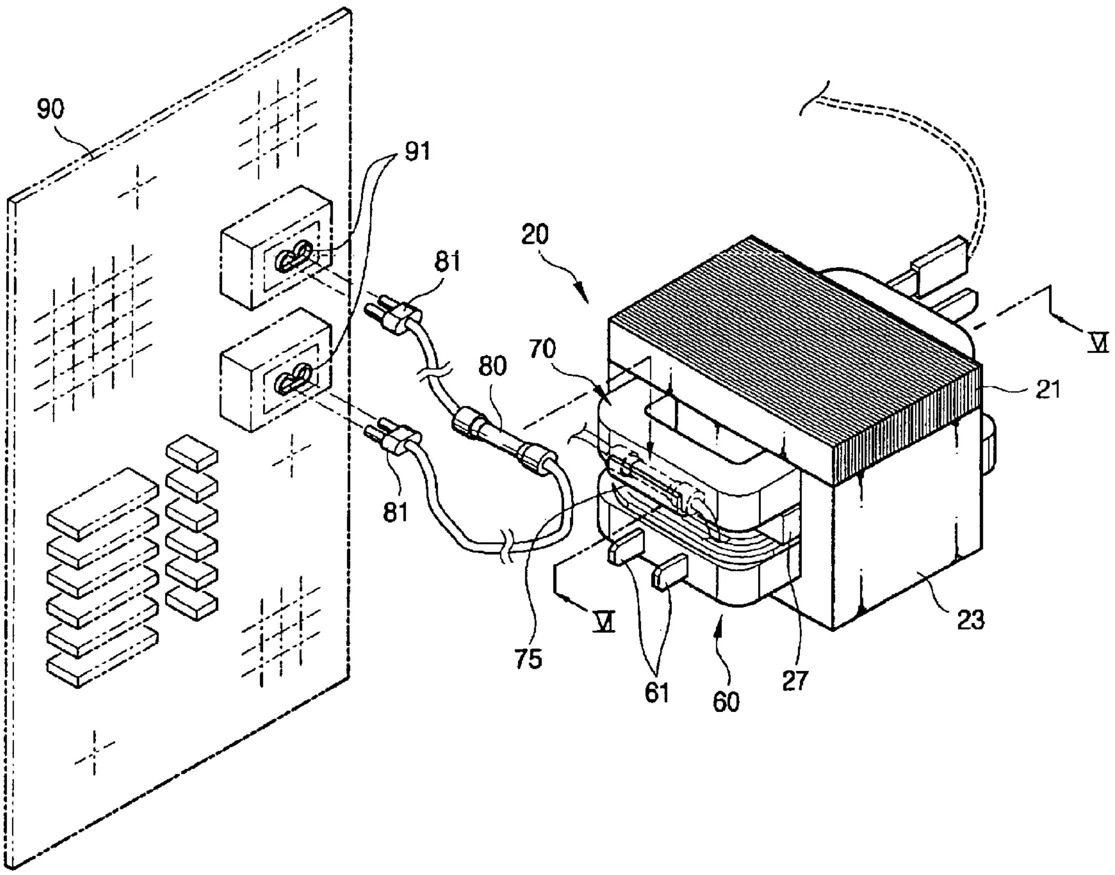
FIG. 5 is a flowchart of a manufacturing process of the secondary coil of FIG. 4.
Figure 6:
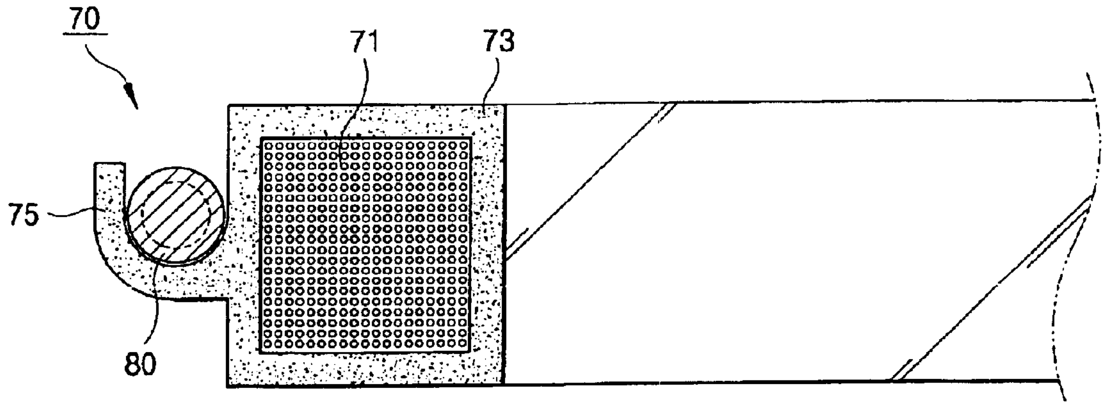
FIG. 6 is an enlarged perspective view of a high voltage transformer including a secondary coil part according to another preferred embodiment of the present invention.

As indicated above, FIG. 5 is an enlarged perspective view of a high voltage transformer in which a secondary coil part according to a secondary embodiment of the present invention is installed on a printed circuit board (PCB), while FIG. 6 is an enlarged cross sectional view of the secondary coil part, taken generally line VI—VI of FIG. 5.

This embodiment is similar to that described above and hence, description of parts which correspond to those in the high voltage transformer according to the first embodiment of the present invention will be dispensed with or only briefly made reference to. The high voltage transformer 20 of FIG. 5 includes a pair of cores 21 and 23, and primary and secondary coil parts 60 and 70. Between the coil parts 60 and 70 is installed an insulation member or micasheet 27 made of suitable insulating material. A temperature sensor 80 for detecting temperature of a secondary coil 71 (see FIG. 6) in order to protect the secondary circuit is installed in the secondary coil part 70. The secondary coil 71 of the secondary coil part 70 has an annular or ring shape and, as shown in FIG. 6, an insulation molding part 73 is provided for insulating the secondary coil 71 from other components including the pair of cores 21 and 23. The insulation molding part 73 has a sensor accommodating portion 75 in which the temperature sensor 80 is accommodated. The sensor accommodating portion 75 is in the shape of a pocket formed by a curved generally L-shaped projection so that the temperature sensor 43 can be easily put into pocket portion 75 and taken out therefrom.

A thermostat or a thermistor may be used as the temperature sensor 80 to be accommodated in the pocket-shaped sensor accommodating portion 75. More preferably, a fuse is used which provides automatic cut off of current flow when the temperature is above a predetermined value. Where the fuse is installed in the sensor accommodating portion 75, the method of connection will vary according to the capacity of the fuse to be installed.

Considering the latter point in more detail, where, for example, a small capacity fuse is installed adjacent to the secondary coil 71, a pair of connector elements 81 connected to the respective terminals of the fuse are, as shown in FIG. 6, directly connected to corresponding connectors 91 installed at the PCB 90. Where a large capacity (over 10A) fuse is used (and this embodiment is not illustrated in the drawings), one terminal of the fuse is connected to either of the input terminals 61 associated with the primary coil part 60 and the other terminal thereof is connected to the external power supply.

Figure 7:
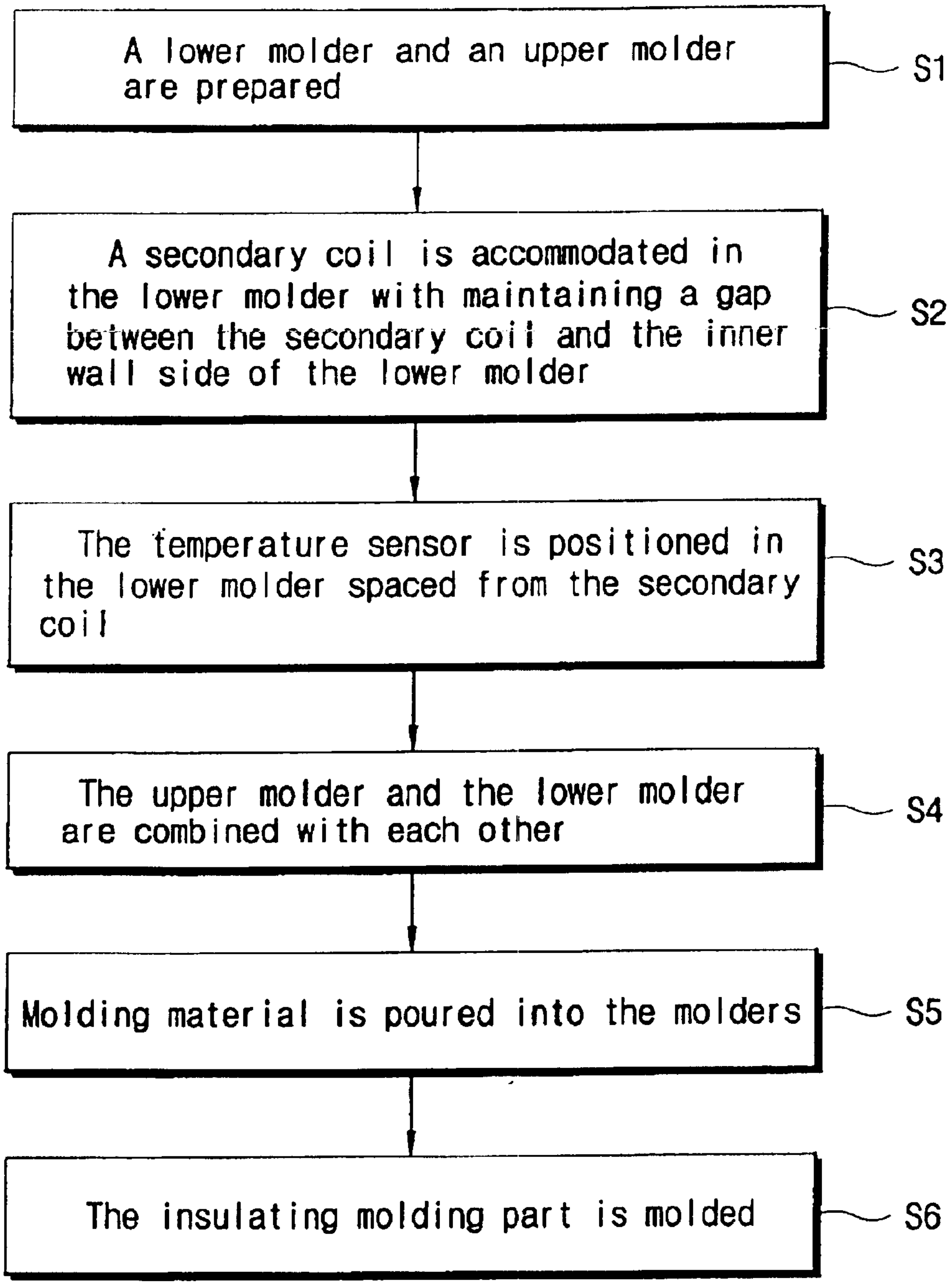
FIG. 7 is an enlarged cross sectional view taken generally along line VII—VII of FIG. 6 showing a portion of the secondary coil.
Figure 8:
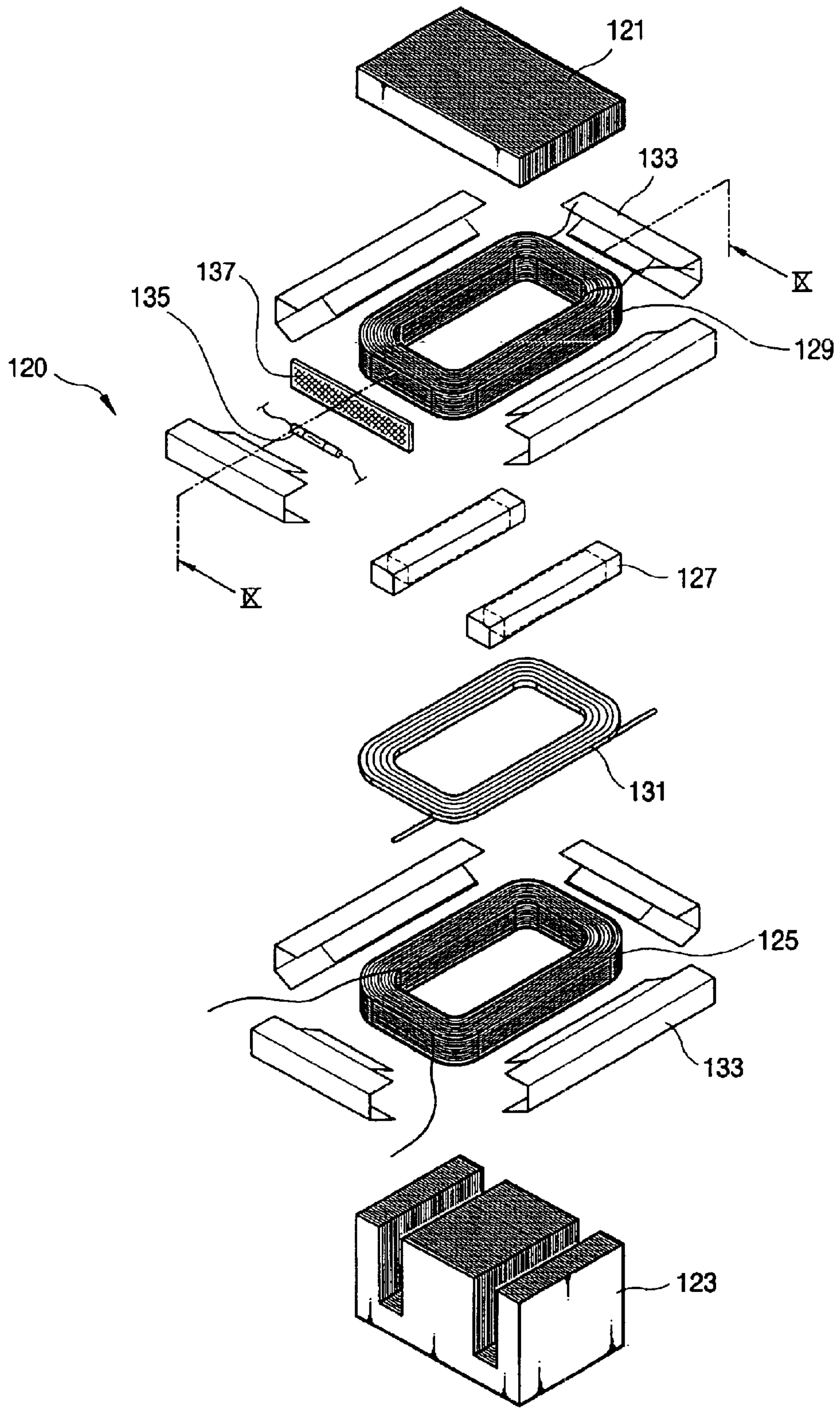
FIG. 8, which was described above, is a perspective view of a conventional high voltage transformer.
Figure 9:
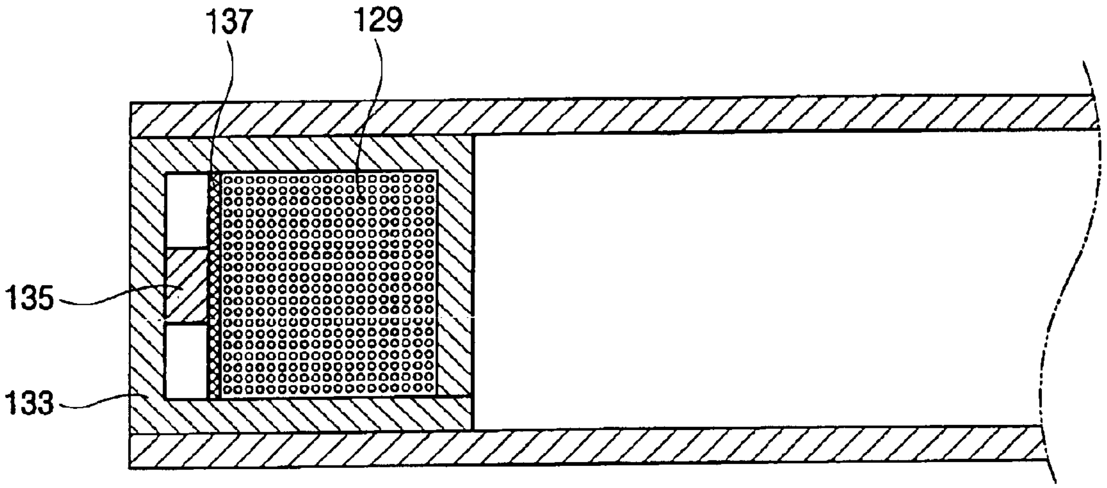
FIG. 9, which was also described above, is an enlarged cross sectional view taken generally along line IX—IX of FIG. 8 showing a portion of the secondary coil part.

FIG. 7 is a flowchart showing the steps in a manufacturing process for either of the secondary coil part 40 or 70. As shown in FIG. 7, the secondary coil part 40 is manufactured using the following process. A first step comprises preparation of a lower molder or mold in which the secondary coil 41 is to be accommodated, and an upper molder, or mold which is to be assembled to the lower molder and in which a down gate and a cross gate are formed (Step S1). Next, the secondary coil 41 is accommodated in the lower molder while maintaining a gap between the secondary coil 41 and the inner wall side of the lower molder (Step S2). The temperature sensor 43 is then positioned in the lower molder in spaced relation to the secondary coil 41 (Step S3). Next, the upper molder and the lower molder are combined with each other, i.e., brought together or assembled to form a complete mold (Step S4). When this is done, molding material is poured into the assembled molders through the down and cross gates (Step S5). As a result, the insulating molding part 45 for the secondary coil 41 and the temperature sensor 43 are molded as an internal unit (Step S6). In this case, the sensor accommodating part 47 which accommodates the temperature sensor 43 is provided along with the insulation molding part 45.

In the embodiment wherein the pocket-shaped sensor accommodating part 75 of FIGS. 5 and 6 is formed, the step of forming a pocket-shaped portion in the lower mold or molder is required, whereas the step of positioning the temperature sensor 43 in the lower mold or molder is not needed.

With this general manufacturing process, the insulation molding part 45 or 73 is molded in the secondary coil part 40 or 70 to provide insulation from the core and other components.

Because the temperature sensor is enclosed by the insulation molding portion, or is positioned in the pocket-shaped sensor accommodating portion, the temperature sensor can be firmly and securely located adjacent to the secondary coil, thereby improving the detecting accuracy of the temperature sensor.

In the embodiment wherein the sensor accommodating portion is formed in a pocket shape, the sensor can be easily put into, or taken out from, the sensor accommodating portion, and therefore, it is easier to repair and replace the temperature sensor.

Although the present invention has been described in connection with preferred embodiments thereof, it will be appreciated by those skilled in the art that additions, modifications, substitutions and deletions not specifically described may be made therein without departing from the spirit and scope of the invention.

What is claimed is:

1. A method of manufacturing a high voltage transformer for a microwave oven, said transformer including a core, primary and secondary coils, and a temperature sensor for detecting temperature of the secondary coil, said method including the steps of:

providing a molder member for forming, in use, an insulating molding part and including a sensor accommodating portion;

disposing the secondary coil and the temperature sensor in the molder member with the sensor accommodated in the sensor accommodating portion;

molding the secondary coil and the temperature sensor accommodated in the molder member so as to form the insulating molding part including the sensor accommodating portion accommodating the temperature sensor, and enclosing at least part of the secondary coil such that the temperature sensor is fixed in position relative to said secondary coil.

2. A method according to claim 1 wherein the molding step comprises molding a temperature sensor accommodating portion into said molding part in which said temperature sensor is accommodated.

3. A method according to claim 2 wherein said sensor and said secondary coil are molded together such that said sensor is disposed directly adjacent to said secondary coil.

4. The method according to claim 1, wherein the temperature sensor comprises one of a thermostat and a thermistor.

5. The method according to claim 4, wherein said sensor comprises a thermistor and a fuse.

6. A method of manufacturing a high voltage transformer for a microwave oven, the transformer including a core, primary and secondary coils, and a temperature sensor for detecting temperature of the secondary coil, and the method including the steps of:

providing a molder member for forming an insulating molding part including an external sensor accommodating portion;

disposing the secondary coil in the molder member; and molding the secondary coil in the molder member to form said insulating molding part with at least a part of said secondary coil molded therein and to form said external sensor accommodating portion in spaced relation to said secondary coil so as to permit placement of the temperature sensor into, and removal of the sensor from, the sensor accommodating portion.

7. The method according to claim 6 wherein said external sensor accommodating portion is formed as a pocket defining member on an outside surface of the insulating molding part.

8. The manufacturing method according to claim 6, wherein the temperature sensor comprises one of a thermostat, a thermistor and a fuse.

* * * * *